(12) United States Patent
Tan

(10) Patent No.: US 12,081,399 B2
(45) Date of Patent: Sep. 3, 2024

(54) METHOD FOR IMPLEMENTING OMCI MANAGEMENT INSTANCE BASED ON CONFIGURATION FILE

(71) Applicant: Airoha Technology (Suzhou) Limited, Suzhou (CN)

(72) Inventor: Min-Gang Tan, Suzhou (CN)

(73) Assignee: AIROHA TECHNOLOGY (SUZHOU) LIMITED, Suzhou (CN)

( * ) Notice: Subject to any disclaimer, the term of this patent is extended or adjusted under 35 U.S.C. 154(b) by 58 days.

(21) Appl. No.: 17/852,427

(22) Filed: Jun. 29, 2022

(65) Prior Publication Data
US 2023/0188420 A1 Jun. 15, 2023

(30) Foreign Application Priority Data

Dec. 15, 2021 (TW) .................................. 110146940

(51) Int. Cl.
| | |
|---|---|
| H04L 41/0866 | (2022.01) |
| G06F 9/4401 | (2018.01) |
| G06F 9/445 | (2018.01) |
| G06F 15/177 | (2006.01) |
| H04B 10/27 | (2013.01) |
| H04L 41/0813 | (2022.01) |

(52) U.S. Cl.
CPC ...... H04L 41/0866 (2013.01); G06F 9/44505 (2013.01); H04B 10/27 (2013.01); H04L 41/0813 (2013.01); *G06F 9/4411* (2013.01); *G06F 15/177* (2013.01)

(58) Field of Classification Search
CPC ............. H04L 41/0806; H04L 41/0803; H04L 41/0866; H04L 41/0813; G06F 9/44505; G06F 9/4411; G06F 15/177; H04B 10/27

USPC .............................. 713/1, 100; 709/220, 223
See application file for complete search history.

(56) References Cited

U.S. PATENT DOCUMENTS

| | | | | |
|---|---|---|---|---|
| 10,282,346 | B1* | 5/2019 | Lue ..................... | G06F 9/44505 |
| 2009/0300160 | A1* | 12/2009 | Wan .................... | H04L 41/0843 |
| | | | | 709/223 |
| 2011/0072119 | A1* | 3/2011 | Bronstein ............. | H04L 41/046 |
| | | | | 709/222 |
| 2011/0131624 | A1* | 6/2011 | Wu ..................... | H04Q 11/0067 |
| | | | | 725/111 |

(Continued)

FOREIGN PATENT DOCUMENTS

| | | |
|---|---|---|
| CN | 105429789 B | 5/2018 |
| CN | 109412844 A | 3/2019 |
| CN | 107147630 B | 12/2020 |

*Primary Examiner* — Ji H Bae
(74) *Attorney, Agent, or Firm* — BACON & THOMAS, PLLC

(57) ABSTRACT

The invention relates to a method for implementing an ONU Management and Control Interface (OMCI) management instance based on a configuration file. The method is constructed on a passive optical network. The passive optical network includes an ONU and an OLT, the OLT using an OMCI specification as a management protocol to create a management entity in the ONU. The method includes: executing a software for the ONU to activate an OMCI process; and checking if a configuration file exists under a specific system path of the ONU by the software; if the configuration file exists, loading the configuration file by the software, and configuring the management entity according to the configuration file.

16 Claims, 4 Drawing Sheets

(56) References Cited

U.S. PATENT DOCUMENTS

2012/0251113 A1* 10/2012 Hajduczenia ......... H04L 41/082
398/66
2022/0103259 A1* 3/2022 Zhong .................. H04L 7/0075

* cited by examiner

| golden_onci.txt | | | | | | | | |
|---|---|---|---|---|---|---|---|---|
| | tableMask | privateMe | index | classId | instanceId | attrMask | attrVal | attrLenStr | encrypted |
| 1 | ff7f | 0 | 1 | 2 | 0 | 8000 | 0000000000000000000000000000000000 | 0000000000000000000000000000000000 | xx |
| 2 | ff7f | 0 | 2 | 5 | 180 | f000 | f8f80147464c5431333100000000000000 | 0000000000000000000000000000000000 | xx |
| 3 | ff7f | 0 | 3 | 5 | 180 | c00 | 47464c5431333100000000000000000000 | 0000000000000000000000000000000000 | xx |
| 4 | ff7f | 0 | 4 | 5 | 101 | f000 | 2f2f0447464c5431333100000000000000 | 0000000000000000000000000000000000 | xx |
| 5 | ff7f | 0 | 5 | 5 | 101 | c00 | 47464c5431333100000000000000000000 | 0000000000000000000000000000000000 | xx |
| 6 | ff7f | 0 | 6 | 6 | 180 | f000 | f8014a464848736001847464c5431333100 | 0000000000000000000000000000000000 | xx |
| 7 | ff7f | 0 | 7 | 6 | 180 | f00 | 0000000000000000000000000000000000 | 0000000000000000000000000000000000 | xx |
| 8 | ff7f | 0 | 8 | 6 | 180 | f8 | 47464c5431333100000000000000000000 | 0000000000000000000000000000000000 | xx |
| 9 | ff7f | 0 | 9 | 6 | 101 | 4 | 0000000000000000000000000000000000 | 0000000000000000000000000000000000 | xx |
| 10 | ff7f | 0 | 10 | 6 | 101 | f000 | 2f044a464848736001847464c5431333100 | 0000000000000000000000000000000000 | xx |
| 11 | ff7f | 0 | 11 | 6 | 101 | f00 | 0000000000000000000000000000000000 | 0000000000000000000000000000000000 | xx |
| 12 | ff7f | 0 | 12 | 6 | 101 | 18 | 47464c5431333100000000000000000000 | 0000000000000000000000000000000000 | xx |
| 13 | ff7f | 0 | 13 | 6 | 101 | 4 | 0000000000000000000000000000000000 | 0000000000000000000000000000000000 | xx |
| 14 | ff7f | 0 | 14 | 131 | 0 | c000 | 0000000000000000000000000000000000 | 0000000000000000000000000000000000 | xx |

FIG. 2

METHOD FOR IMPLEMENTING OMCI MANAGEMENT INSTANCE BASED ON CONFIGURATION FILE

CROSS REFERENCE TO RELATED APPLICATION

This application claims the benefits of the Taiwan Patent Application Serial Number 110146940, filed on Dec. 15, 2021, the subject matter of which is incorporated herein by reference.

BACKGROUND OF THE INVENTION

1. Field of the Invention

The present invention relates to a technical field of the Optical Access Network (OAN), and, more particularly, to a method for implementing an Optical Network Unit (ONU) Management and Control Interface (OMCI) management interface based on a configuration file.

2. Description of Related Art

Gigabit-capable Passive Optical Network (GPON) is a developing standard, providing faster data-transmission services to users, and typically including internet, telephone, or TV broadcasting.

FIG. 1 shows a schematic diagram of a passive optical network 100.

The passive optical network 100 includes a plurality of Optical Network Units (ONUs), such as ONUs 101-1 to 101-3, which are connected to an Optical Line Termination (OLT) 103 via a Passive Optical Splitter 102. Downstream data are broadcasted to all of the ONUs 101, and each of the ONUs 101-1 to 101-3 will obtain required data by filtering the downstream data. The OLT 103 allocates different time periods for each of the ONUs 101. Each of the ONUs 101 transmits its upstream data to the OLT 103 during its allocated time period. The Passive Optical Splitter 102 splits a single line into multiple lines.

Managements of the ONUs 101, such as configuration management, fault management, performance management, security management, and so on, are implemented by a management module of an ONU Management and Control Interface (OMCI) of the OLT 103. In order to solve the problems of various complicated network applications, the OMCI specification can support approximately four hundred management instances according to the section 11.2.4 of the G.988 specification. In fact, only tens of management instances are required for commonly used services configurations.

When a connection between the ONU 101 and OLT 103 is established, an access permission authorization is required, which includes finding, authorizing, and registering. However, since different manufactures may have different understandings to the specification when developing OMCI management modules for OLTs, several incompatible problems often occur when an ONU is connected to different OLTs developed by different manufactures. In fact, in a scenario of registration and service configuration between an ONU 101 and an OLT 103, the OLT 103 usually requires the ONU 101 to support some undeveloped management instances, or to modify some attributes in existing management instances.

In particular, a traditional method to implement the requirement "to support some undeveloped management instances" is to modify a software, recompile it to generate a firmware, and then upgrade the firmware to a single board. However, the software modification is extremely time consuming, increasing development period.

Another traditional method to implement the requirement "to modify some attributes in implemented management instances existing therein" is to modify a software (and particularly, parameters of the software), or to modify an attribute value by an instruction. However, modifying an attribute value by an instruction sometimes cannot cover all of the management instances and all of attribute values. In fact, sometimes it may involve additional works such as coding modification, firmware compilation, firmware update, and so on, to modify some attribute values. Further continuous trials and errors are required until the access permission authorization is obtained, which is extremely inefficient.

Therefore, it is desirable to provide a method for an OMCI management with higher efficiency to mitigate or obviate the aforementioned problems.

SUMMARY OF THE INVENTION

In view of foregoing, the present invention is a method for implementing an OMCI management instance based on a "configuration file", to significantly improve the efficiency when solving an OMCI exchange problem. Here, in the computer science field, the configuration file is a type of computer file, which can be used to configure parameters and initial settings for some computer programs. In the present invention, the configuration file can be used to implement "batch initialization of parameters" and "batch adding/deleting of OMCI management instances".

In the aspect of "batch initialization of parameters", since the configuration file has a specific format, it can select and re-initialize one or more parameters in one or more OMCI management instances, and accordingly it can be easily used to select and modify the parameters according to a user's requirement. The parameters may be inputted manually by the user, or generated by using a script, so as to satisfy different scenario requirements. In addition, it is also possible to consider generating the configuration file according to other's data. In such a case, a comparison may be made to check a difference between the configuration file generated by the user's own data and the configuration file generated by the other's data.

In the aspect of the "batch adding/deleting OMCI management instances", since the configuration file has a specific format, it can add unsupported OMCI management instances by batches, wherein these added OMCI management instances can be exchanged normally, but they do not implement particular functions of the OMCI management instances. Also, since the configuration file has a specific format, it can be easily used to select and delete one or more supported OMCI management instances, and this is advantageous because it can release memory or computation resources. In addition, in case of a certain OLT having limited capability, when a reporting capability of an ONU is greater than a receiving capability of the OLT, the OLT may refuse to give a successful authorization to the ONU. In such a case, some OMCI management instances need to be deleted.

In view of this, according to an aspect of the present invention, a method for implementing an OMCI management instance based on a configuration file is provided. The method is constructed on a passive optical network. The passive optical network includes an ONU and an OLT, the OLT using an OMCI specification as a management protocol to create a management entity in the ONU. The method includes: executing a software for the ONU to activate an OMCI process; and checking if a configuration file exists under a specific system path of the ONU by the software; if the configuration file exists, loading the configuration file by the software, and configuring the management entity according to the configuration file.

Optionally, or preferably, configuring the management entity according to the configuration file includes: modifying one or more parameters of a supported OMCI management instance in the management entity.

Optionally, or preferably, configuring the management entity according to the configuration file includes: adding one or more unsupported OMCI management instances into the management entity, or deleting one or more supported OMCI management instances from the management entity.

Optionally, or preferably, the configuration file is in a TXT format.

Optionally, or preferably, the configuration file includes a plurality of rows, the plurality of rows are arranged such that each of the rows describes a management instance, or such that a plurality of attributes of a management instance are separately described in the plurality of rows.

Optionally, or preferably, the configuration file describes an OMCI management instance attribute defined by G.988 specification, the attribute including a classID, an instanceIC, an attrMask or an attrVal.

Optionally, or preferably, the method of the present invention further includes: generating the configuration file by a script.

Optionally, or preferably, generating the configuration file by the script includes: selecting a data analysis mode.

Optionally, or preferably, generating the configuration file by the script includes: capturing an authorized OMCI message by another ONU, and loading the authorized OMCI message into the script.

Optionally, or preferably, a programming tool is used to perform an analysis and an organization for the captured authorized OMCI message, thereby generating the configuration file by the script.

Optionally, or preferably, the configuration file is generated by a third party's data.

Optionally, or preferably, the configuration file is uploaded via tftp/ftp to the system path of the ONU by the software.

Optionally, or preferably, if the configuration file does not exist, using a predetermined initial value of the OMCI management instance to configure the management entity.

Optionally, or preferably, the method of the present invention further includes: after the management entity is configured, uploading a management database to the OLT.

Optionally, or preferably, the method of the present invention further includes: after the management entity is configured, starting to receive an OMCI operation from the OLT, the OMCI operation comprising setting, getting, creating or deleting.

Optionally, or preferably, the method of the present invention further includes: after an OMCI exchange message is received, checking if an OMCI management instance related to the OMCI exchange message is supported; if the OMCI management instance is supported, performing a normal handle according to an original logic of the ONU; if the OMCI management instance is unsupported, returning a result by the configuration file.

Other objects, advantages, and novel features of the invention will become more apparent from the following detailed description when taken in conjunction with the accompanying drawings.

BRIEF DESCRIPTION OF THE DRAWINGS

FIG. 2 shows an exemplary configuration file according to an embodiment of the present invention;

DETAILED DESCRIPTION OF THE EMBODIMENT

Figure 1:
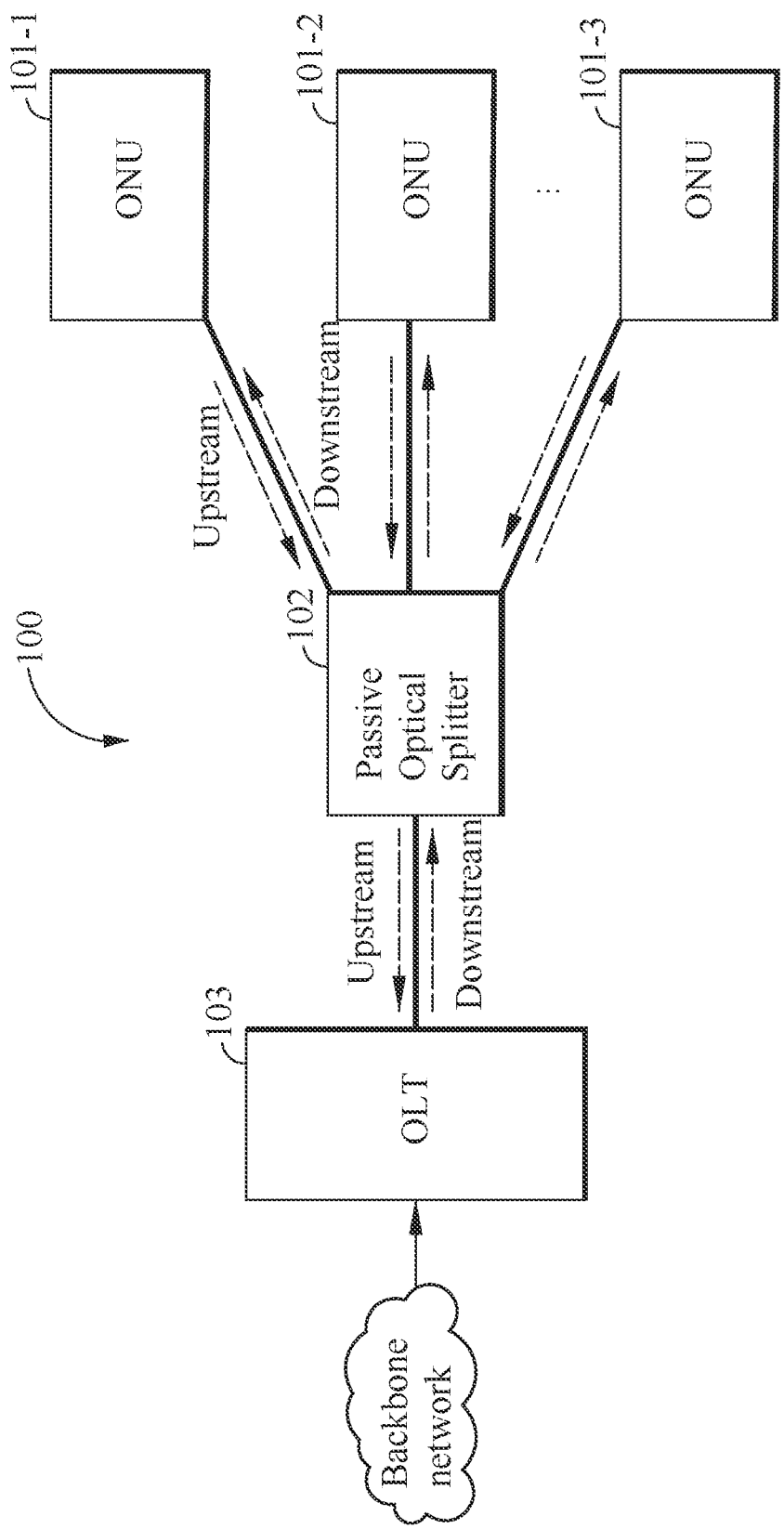
FIG. 1 shows a schematic diagram of a passive optical network.

Different embodiments of the present invention are provided in the following description. These embodiments are meant to explain the technical content of the present invention, but not meant to limit the scope of the present invention. A feature described in an embodiment may be applied to other embodiments by suitable modification, substitution, combination, or separation.

It should be noted that, in the present specification, when a component is described to have an element, it means that the component may have one or more of the elements, and it does not mean that the component has only one of the element, except otherwise specified.

Moreover, in the present specification, the ordinal numbers, such as "first" or "second", are used to distinguish a plurality of elements having the same name, and it does not mean that there is essentially a level, a rank, an executing order, or a manufacturing order among the elements, except otherwise specified. A "first" element and a "second" element may exist together in the same component, or alternatively, they may exist in different components, respectively. The existence of an element described by a greater ordinal number does not essentially mean the existent of another element described by a smaller ordinal number.

Moreover, in the present specification, the terms, such as "top", "bottom", "left", "right", "front", "back", or "middle", as well as the terms, such as "on", "above", "under", "below", or "between", are used to describe the relative positions among a plurality of elements, and the described relative positions may be interpreted to include their translation, rotation, or reflection.

Moreover, in the present specification, when an element is described to be arranged "on" another element, it does not essentially mean that the elements contact the other element, except otherwise specified. Such interpretation is applied to other cases similar to the case of "on".

Moreover, in the present specification, the terms, such as "preferably" or "advantageously", are used to describe an optional or additional element or feature, and in other words, the element or the feature is not an essential element, and may be ignored in some embodiments.

Moreover, in the present specification, when an element is described to be "suitable for" or "adapted to" another element, the other element is an example or a reference helpful in imagination of properties or applications of the element, and the other element is not to be considered to form a part of a claimed subject matter; similarly, except otherwise specified; similarly, in the present specification, when an element is described to be "suitable for" or "adapted to" a configuration or an action, the description is made to focus on properties or applications of the element, and it does not essentially mean that the configuration has been set or the action has been performed, except otherwise specified.

Moreover, a terminal or a server may include the aforementioned element(s), or be implemented in the aforementioned manner(s).

A method for implementing an OMCI management instance based on a configuration file of the present invention is implemented in the GPON network. The GPON network includes one or more ONUs connected to an OLT. The OLT creates a management entity (ME) in the ONU following an OMCI specification. The management entity includes one or more supported OMCI management instances. The ONU can report what capabilities the ONU has, and accordingly tell the OLT how to control the ONU, but, however, an executing logic of the OLT is controlled by the OLT itself.

Next, a software developed by the present invention is executed. The software can modify contents of the one or more supported OMCI management instances, such as attribute values and initial values thereof. In addition, the software can further add one or more unsupported OMCI management instances into the management entity, or delete one or more supported OMCI management instances from the management entity in the ONU.

In particular, according to the present invention, the software can import a configuration file, which may be a configuration file in a TXT format, to perform the aforementioned modification, addition or deletion.

FIG. 2 shows an exemplary configuration file according to an embodiment of the present invention.

As shown in FIG. 2, each row of the configuration file describes each OMCI management instance. However, apart from the aforementioned case in which each row describes one OMCI management instance, the configuration file may be arranged in another way where a plurality of attributes of a management instance are separately described in different rows, in other words, one management instance is described in a plurality of rows.

As shown in FIG. 2, each row corresponds to OMCI parameter or attribute of the configuration file. For example, "tableMask" represents a way to use a bit mask, and points out which fields in the configuration file are in use. For example, "privateME", "index", "InstantId", and so on, are in use as shown, where "privateME" indicates whether a private management instance exists, in which the private management instance is an instance that G.988 reserves for a user to define for user necessity. "index" is used to count how many rows exist. "classID" (Managed entity class value), "InstantID" (Managed entity ID), "attrMask" and "attrVal" can be understood as what defined in G.988, so their details will not be described herein for brevity. "attrLenStr" is used to expand the OMCI and set a length to an attribute. "encrypted" represents whether the "attrVal" in the TXT file has been encrypted. The parameters or the attributes are not limited thereto. More OMCI parameters may be introduced depending on requirement of practical applications. Also, according to the present invention, whenever a new protocol or specification is developed in the future, it is easy to introduce more OMCI parameters through the configuration file of the present invention.

The format of the configuration file is arranged in a way that a part or the whole follows the definitions in G.988 specification. In the example of FIG. 2, the parameters of "classID", "instanceID", "attrMask", and "attrVal" are defined according to G.988 specification, while other parameters are defined by the user. Accordingly, since the configuration file has a specific format, the software can initialize the OMCI parameters by batches, or add or reduce the OMCI management instances by batches according to the configuration file with configuring the configuration file following its format Moreover, in view of the convenience of the TXT format, the configuration file may be generated by a script. Commonly used script tool includes Python, Shell, and so on. The detailed steps will be described in the following. With the script, manpower and time consumed for manually input can be reduced, as well as the possibility of an erroneous input can be avoided. Furthermore, it is possible to consider generating the configuration file by other's data. Further, a comparison may be made to check a difference between the configuration file generated by the user's own data and the configuration file generated by the others' data.

The method of the present invention can implement a required OMCI management instance in a faster way, significantly improving the efficiency while solving an OMCI exchange problem, and avoiding a long software development period at the same time.

Figure 3:
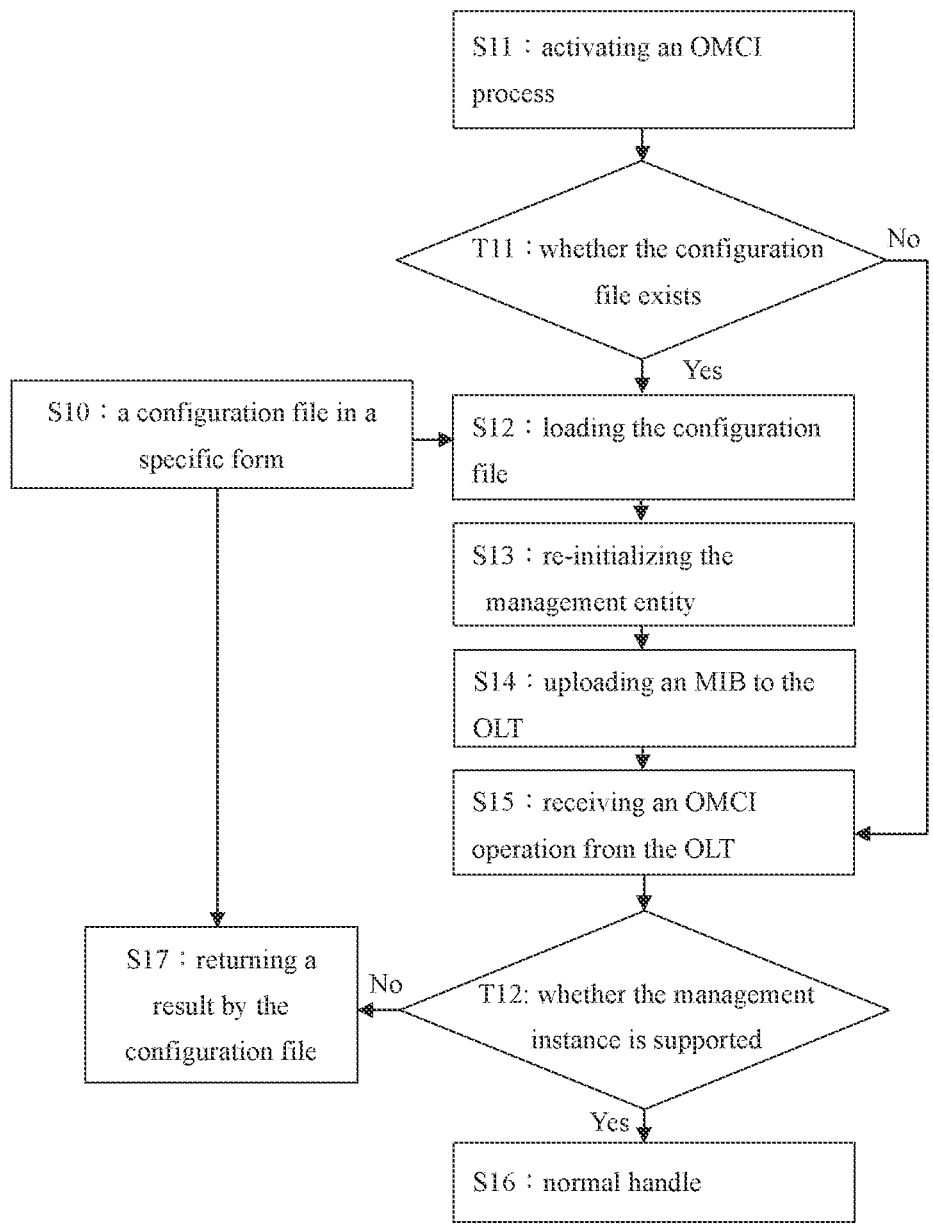
FIG. 3 shows a flowchart of implementing an OMCI management instance based on a configuration file according to an embodiment of the present invention.

FIG. 3 shows a flowchart of implementing an OMCI management instance based on a configuration file according to an embodiment of the present invention.

The method for implementing an OMCI management instance based on a configuration file starts from step S11: executing a software for the ONU to activate an OMCI process to begin an initialization procedure therefor. As mentioned above, the OLT and the ONU will conduct information exchange according to OMCI specification.

After the OMCI process of step S11 is activated, a determination step T11 is then executed, in which a configuration file is checked to determine whether it exists under a specific system path of the ONU? If the configuration file exists (the determination result in step T11 shows "yes"), step S12 is then executed, in which the configuration file is loaded for an initialization procedure, wherein the configuration file is provided by an additional step S10, in which the configuration file is generated in a specific format. Details for generating the configuration file are described in FIG. 4. On the contrary, if the configuration file does not exist (the determination result in step T11 shows "no"), predetermined initial values are then used in attributes of the required OMCI management instance, and the method jumps to step S15, in which an OMCI operation is received from the OLT.

Step S13 is then executed following step S12, in which an OMCI management entity is re-initialized according to relevant fields in the configuration file, wherein the initialization procedure mainly includes adding or deleting OMCI management instances. For example, a private management instance for China Telecom to obtain a Logic ID (LOID) authorization is added to fulfill the authorization requirement of China Telegram; or, attribute values of a supported OMCI management instance, for example, attribute values in "Vendor ID", "Version", "serial number", and so on, mentioned in ONU-G of section 9.1.1, are modified.

Next, step S14 is executed, in which a Management Information Base (MIB) is uploaded to the OLT. The MIB is an ONU capability collection reported by the ONU. Before the MIB is reported, the OLT will inquire if the ONU has reported the MIB. If the ONU has reported the MIB, the ONU does not need to report it again. However, it is still possible to configure as to request the ONU to report the MIB again even though it has reported it already.

Next, step S15 is executed, in which an OMCI operation is received from the OLT, such as setting, getting, creating or deleting.

During an exchange procedure of the OMCI process, after the OMCI exchange message is received, a determination step T12 is then executed, in which the OMCI management instance related to the OMCI exchange message is checked to determine whether it is supported. If the OMCI management instance is supported (the determination result in step T12 shows "yes"), step S16 is then executed, in which relevant functions are executed to perform a normal handle according to an original logic of the ONU, wherein the normal handle mainly includes an action to convert the OMCI operation forwarded from the OLT, such as setting, getting, creating or deleting, and so on, into a local executing logic of the ONU, and to convert data forwarded from the OLT into a local data structure of the ONU, for the ONU to process these data according to the local executing logic of the ONU. On the contrary, if the OMCI management instance is unsupported (the determination result in step T12 shows "no"), step S17 is then executed, in which a result is returned by the configuration file.

Figure 4:
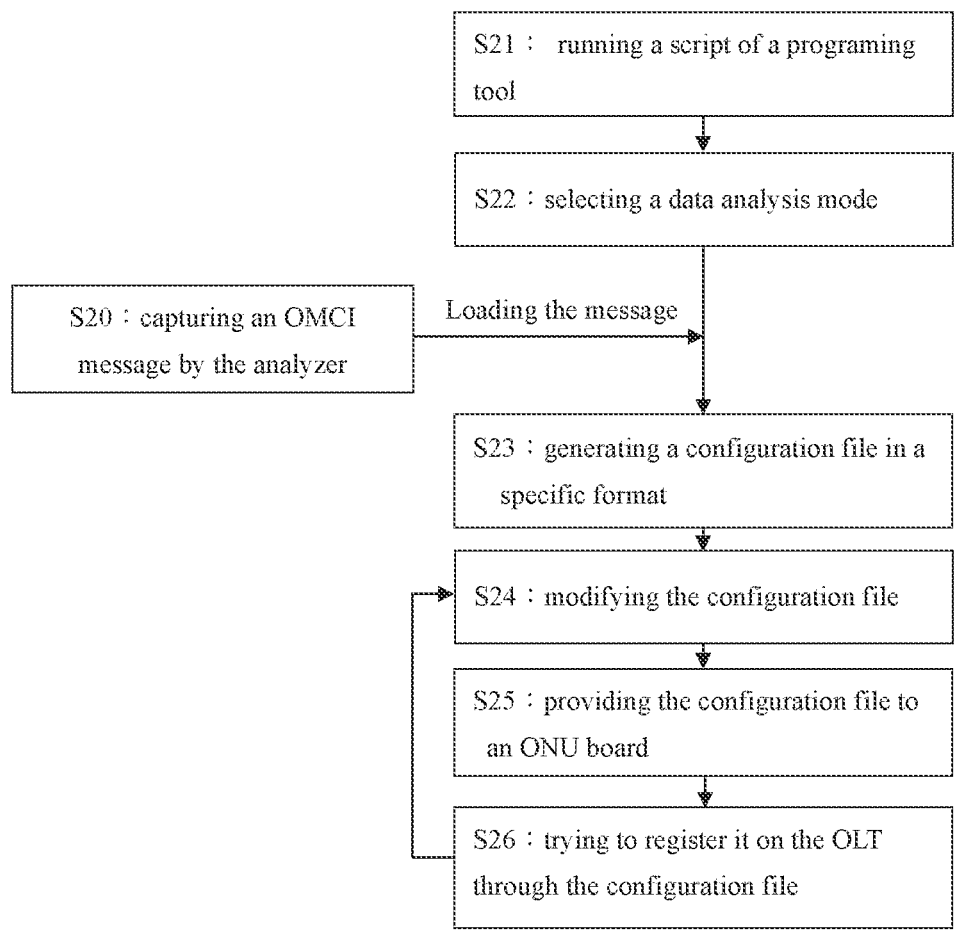
FIG. 4 shows a flowchart of generating a configuration file according to an embodiment of the present invention.

FIG. 4 shows a flowchart of generating a configuration file according to an embodiment of the present invention.

The method for generating the configuration file of the present invention starts from step S21, in which a script of a programming tool is running. The programming tool may be Python, but using another software is still possible.

Next, step S22 is executed, in which a data analyzing mode is selected.

At the same time, an analyzer can capture an OMCI message from another ONU in step S20, wherein the OMCI message can be normally registered and successfully authorized. Next, the OMCI message is loaded into the script of the programming tool.

Next, step S23 is executed, in which the programming tool analyzes and organizes the captured OMCI message, thereby generating the configuration file in a specific format by the script.

Next, step S24 is executed, in which i the configuration file is modified according to practical requirements of a particular scenario. In particular, the user has to select a more different OMCI management instance among them according to the user's experience to perform a re-initialization of a supported OMCI management instance, or to add/delete an OMCI management instance.

Next, step S25 is executed, in which the configuration file is provided to an ONU board. For example, the configuration file in a TXT format is stored in a flash memory, and uploaded via tftp/ftp to a specific system path of the ONU.

Next, step S26 is executed, in which a trial is made to register it in the OLT through the configuration file. This step can correspond to step S10 in FIG. 3. In particular, the configuration file generated by the series of steps in FIG. 4 can be used in the method in FIG. 3. However, if the current configuration file cannot be successfully registered in the OLT, step S24 has to be executed again to manually modify the configuration file.

Although the present invention has been explained in relation to its preferred embodiment, it is to be understood that many other possible modifications and variations can be made without departing from the spirit and scope of the invention as hereinafter claimed.

What is claimed is:

1. A method for implementing an ONU Management and Control Interface (OMCI) management instance based on a configuration file, the method being constructed on a passive optical network, the passive optical network comprising an ONU and an OLT, the OLT using an OMCI specification as a management protocol to create a management entity in the ONU, the method comprising:
   executing a software for the ONU to activate an OMCI process; and
   checking if the configuration file exists under a specific system path of the ONU by the software; if the configuration file exists, loading the configuration file by the software, and configuring the management entity according to the configuration file;
   wherein the configuration file comprises a plurality of parts, the plurality of parts are arranged such that each of the parts describes a management instance, or such that a plurality of attributes of a management instance are separately described in the plurality of parts.

2. The method for implementing the OMCI management instance based on the configuration file as claimed in claim 1, wherein configuring the management entity according to the configuration file comprises:
   modifying one or more parameters of a supported OMCI management instance in the management entity.

3. The method for implementing the OMCI management instance based on the configuration file as claimed in claim 1, wherein configuring the management entity according to the configuration file comprises:
   adding one or more unsupported OMCI management instances into the management entity, or deleting one or more supported OMCI management instances from the management entity.

4. The method for implementing the OMCI management instance based on the configuration file as claimed in claim 1, wherein the configuration file is in a TXT format.

5. The method for implementing the OMCI management instance based on the configuration file as claimed in claim 1, wherein the configuration file describes an OMCI management instance attribute defined by G.988 specification, the attribute comprising a classID, an instanceIC, an attrMask or an attrVal.

6. The method for implementing the OMCI management instance based on the configuration file as claimed in claim 1, further comprising:
   generating the configuration file by a script.

7. The method for implementing the OMCI management instance based on the configuration file as claimed in claim 6, wherein generating the configuration file by the script comprises:
   selecting a data analysis mode.

8. The method for implementing the OMCI management instance based on the configuration file as claimed in claim 6, wherein generating the configuration file by the script comprises:
   capturing an authorized OMCI message by another ONU, and loading the authorized OMCI message into the script.

9. The method for implementing the OMCI management instance based on the configuration file as claimed in claim 8, wherein a programming tool is used to perform an analysis and an organization for the captured authorized OMCI message, thereby generating the configuration file by the script.

10. The method for implementing the OMCI management instance based on the configuration file as claimed in claim 1, wherein the configuration file is generated by a third party's data.

11. The method for implementing the OMCI management instance based on the configuration file as claimed in claim 1, wherein the configuration file is uploaded via tftp/ftp to the specific system path of the ONU by the software.

12. The method for implementing the OMCI management instance based on the configuration file as claimed in claim 1, wherein if the configuration file does not exist, using a predetermined initial value of the OMCI management instance to configure the management entity.

13. The method for implementing the OMCI management instance based on the configuration file as claimed in claim 1, further comprising:
after the management entity is configured, uploading a management database to the OLT.

14. The method for implementing the OMCI management instance based on the configuration file as claimed in claim 1, further comprising:
after the management entity is configured, starting to receive an OMCI operation from the OLT, the OMCI operation comprising setting, getting, creating or deleting.

15. The method for implementing the OMCI management instance based on the configuration file as claimed in claim 1, further comprising:
after an OMCI exchange message is received, checking if an OMCI management instance related to the OMCI exchange message is supported; if the OMCI management instance is supported, performing a normal handle according to an original logic of the ONU; if the OMCI management instance is unsupported, returning a result by the configuration file.

16. A method for implementing an ONU Management and Control Interface (OMCI) management instance based on a configuration file, the method being constructed on a passive optical network, the passive optical network comprising an ONU and an OLT, the OLT using an OMCI specification as a management protocol to create a management entity in the ONU, the method comprising:
executing a software for the ONU to activate an OMCI process;
checking if the configuration file exists under a specific system path of the ONU by the software; if the configuration file exists, loading the configuration file by the software, and configuring the management entity according to the configuration file; and
after the management entity is configured, uploading a management database to the OLT.

* * * * *